(12) United States Patent
Noda et al.

(10) Patent No.: US 8,035,328 B2
(45) Date of Patent: Oct. 11, 2011

(54) STATE MEMORIZING DEVICE FOR MOVABLE MEMBER

(75) Inventors: Kohei Noda, Toyota (JP); Soichiro Hozumi, Nishio (JP); Hideyuki Kanie, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 425 days.

(21) Appl. No.: 12/411,787

(22) Filed: Mar. 26, 2009

(65) Prior Publication Data

US 2009/0295322 A1 Dec. 3, 2009

(30) Foreign Application Priority Data

May 29, 2008 (JP) ................................. 2008-141488

(51) Int. Cl.
*G05B 9/02* (2006.01)
*G06F 17/00* (2006.01)
*B60N 2/04* (2006.01)
*A47C 1/00* (2006.01)

(52) U.S. Cl. ........ 318/566; 318/266; 318/430; 318/432; 318/434; 307/10.1; 701/2; 701/49

(58) Field of Classification Search .................. 318/266, 318/466, 430, 432, 434, 54, 566, 565; 701/2, 701/49; 307/10.1

See application file for complete search history.

(56) References Cited

U.S. PATENT DOCUMENTS

| 4,510,426 | A | * | 4/1985 | Michaels et al. ............... 318/565 |
| 4,733,145 | A | * | 3/1988 | Ohashi et al. .................... 318/54 |
| 7,759,891 | B2 | * | 7/2010 | Serizawa et al. .............. 318/434 |
| 2007/0046074 | A1 | * | 3/2007 | Satta et al. ....................... 297/15 |
| 2007/0046088 | A1 | * | 3/2007 | Satta et al. .................. 297/344.1 |
| 2007/0265738 | A1 | * | 11/2007 | Saito ................................. 701/2 |
| 2007/0290554 | A1 | * | 12/2007 | Teshima et al. .............. 307/10.1 |
| 2008/0055799 | A1 | * | 3/2008 | Serizawa et al. ............... 361/24 |
| 2009/0292425 | A1 | * | 11/2009 | Nagata et al. .................... 701/49 |
| 2011/0046855 | A1 | * | 2/2011 | Hozumi et al. .................. 701/49 |

FOREIGN PATENT DOCUMENTS

| JP | 2000-250629 | 9/2000 |
| JP | 2002-325475 | 11/2002 |

\* cited by examiner

*Primary Examiner* — Paul Ip
(74) *Attorney, Agent, or Firm* — Oblon, Spivak, McClelland, Maier & Neustadt, L.L.P.

(57) ABSTRACT

A state memorizing device for a movable member, includes a lock state determining portion for determining whether or not the movable member, driven by a motor, is in a locked state, based on a motor current, an initial positional information memorizing portion for memorizing an initial positional information indicative of a current position of the movable member before the motor is started, a current positional information calculating portion for calculating a current positional information indicative of the current position of the movable member on the basis of the position indicated by the initial positional information and the motor current, and a current positional information correcting portion for determining the current position of the movable member based on the initial positional information in a case where the locked state of the movable member is detected and an electrification of the motor is stopped after the motor has just been started.

10 Claims, 6 Drawing Sheets

STATE MEMORIZING DEVICE FOR MOVABLE MEMBER

CROSS REFERENCE TO RELATED APPLICATIONS

This application is based on and claims priority under 35 U.S.C. §119 to Japanese Patent Application 2008-141488, filed on May 29, 2008, the entire contents of which is incorporated herein by reference.

FIELD OF THE INVENTION

The present invention relates to a state memorizing device for a movable member for executing a position control to the movable member, which is driven by a motor.

BACKGROUND

There exists a known seat position control device, which is adapted to a vehicle and the like and which automatically adjusts a position of a seat to a desired seat position (i.e. a seat position) memorized in a memory by operating a switch, even after an occupant changes the seat position. In order to adjust the seat position, a slide motor for moving an entire seat forward and rearward relative to a vehicle body, a reclining motor for changing an inclination of a seat-back, and the like are provided at the seat. By driving the above-mentioned motors by a switch operation, the seat is adjustable to any desired position. The seat position control devices for adjusting the seat position disclosed in, for example, JP2000-250629A and JP2002-325475A, detect a ripple component included in a motor current of a motor for driving the seat as a ripple pulse synchronized with a rotation of the motor via a pulse generating circuit having a differentiating circuit, without using a rotational sensor for detecting a rotational position of the motor, and then, the seat position control device executes a position control of the seat on the basis of the detected ripple pulse.

In the case where the position control of the seat and the like is executed by using the ripple pulse synchronized with the rotation of the motor, without using the rotational sensor for detecting the rotational position of the motor, an amount of the motor being actuated (i.e. an amount of actuation) due to an inertia generated after a motor output is stopped is not detectable because the ripple pulse is generated only while the motor is actuated, on the other hand, the ripple pulse is not generated after the motor output is stopped. Therefore, a state memorizing device, disclosed in JP2000-250629A, estimates the actuation amount of the motor generated after the motor output is stopped on the basis of a rotational amount of the motor while being actuated. Then, the state memorizing device, disclosed in JP2000-250629A, corrects a positional information, thereby obtaining a position of the seat. In order to estimate the rotational amount of the motor, the state memorizing device preliminarily stores therein a correction map, which specifies a relationship among an actuation portion, voltage, a pulse period and the like.

Further, in the case where the position control of the seat and the like is executed by using a motor ripple pulse synchronized with the rotation of the motor, without using the rotational sensor for detecting the rotational position of the motor, the rotational position of the motor may not be detected especially in a case where the motor rotates at a very low speed since when the motor is started, because an accurate ripple pulse is not generated when the motor is rotated at the very low speed (a very low speed rotation). Therefore, a control device for the motor disclosed in JP2002-325475A executes a motor control in consideration of the very low speed rotation by detecting the very low speed rotation of the motor when being started by using a motor current of when the motor is started and a motor current of when the motor is normally driven.

The state memorizing device, disclosed in JP2000-250629A, estimates the actuation amount of the motor generated after the motor output is stopped. However, in the case where the motor rotates at the very low speed since when the motor is started, the actuation amount is not accurately estimable. Further, the control device for the motor, disclosed in JP2002-325475A, detects the very low speed rotation of the motor of when being started on the basis of the current flowing through the motor when the motor is started and the current flowing through the motor when the motor is normally driven, and then, the control device estimates the rotational position of the motor. Therefore, the output of the motor is easily stopped. However, in a case where the output of the motor is stopped, the very low speed rotation of the motor is not detectable.

When the output of the motor is stopped in a case where the motor, which is provided at, for example, a seat for a vehicle, a sunroof and the like, is controlled so as to be actuated towards a mechanical end point direction while the seat, the sunroof and the like (the movable member) are positioned at corresponding mechanical end points (at an end point within a range of movement), in other words, in a case where the motor is driven at the very low speed (motor lock), the movable member may be moved opposite from an actuation direction because of backlash, deterioration with age of a gear and the like for changing a position of the movable member or because of deflection and the like of a impact absorbing member provided at the mechanical end point for absorbing an impact generated when a portion for changing the position of the vehicle, the sunroof and the like for the vehicle (i.e. a changing member) contacts the mechanical end point. Such movement in the reverse direction results in a displacement of the memorized position in the control.

If the changing member is further actuated in the mechanical end point direction than the mechanical end point for the deflection amount and an absorbing amount of the impact absorbing member, an actuation amount of the changing member being actuated further in the mechanical end point than the mechanical end point is measured in a case where the current is supplied to a controlling portion. However, if the current supply to the controlling portion is cut, the moving amount of the changing portion moved afterwards by a biasing force acting on the impact absorbing member is not detectable. Accordingly, a displacement occurs between an actual position of the changing member and the position memorized by the controlling portion. Such displacement gradually increases by accumulation of the displacement occurring each time when the above-described phenomenon occurs. Therefore, even if a user operates a switch and the like to retrieve the seat, the sunroof and the like for the vehicle to the preliminarily memorized position, the seat, the son roof and the like may be moved to a position displaced from the position the user desires.

A need thus exists to provide a state memorizing device for a movable member which is not susceptible to the drawback mentioned above.

SUMMARY OF THE INVENTION

According to an aspect of the present invention, a state memorizing device for a movable member, includes a lock state determining portion for determining whether or not the movable member, which is driven by a motor, is in a locked state, on the basis of a motor current supplied to the motor, an initial positional information memorizing portion for memorizing an initial positional information indicative of a current position of the movable member before the motor is started, a current positional information calculating portion for calculating a current positional information indicative of the current position of the movable member on the basis of the position indicated by the initial positional information and the motor current, the current position of the movable member changes in response to an actuation of the motor, and a current positional information correcting portion for determining the current position of the movable member on the basis of the initial positional information in a case where the lock state determining portion determines that the movable member is in the locked state and an electrification of the motor is stopped after the motor has just been started, irrespective of the current positional information calculated by the current positional information calculating portion after the motor is started.

According to another aspect of the invention, a state memorizing device for a movable member, includes a lock state determining portion for determining whether or not the movable member, which is driven by a motor, is in a locked state, on the basis of a motor current supplied to the motor, an initial positional information memorizing portion for memorizing an initial positional information indicative of a current position of the movable member before the motor is started, a current positional information calculating portion for calculating a current positional information indicating the current position of the movable member on the basis of the position indicated by the initial positional information and the motor current, the current position of the movable member changes in response to an actuation of the motor, a lock detection area setting portion for setting a lock detection area so that a predetermined distance is included within a range of movement of the movable member at least at a rear side in a front-rear direction of a vehicle body with reference to a previous lock detection area, at which the locked state of the movable member is detected, and a current positional information correcting portion for determining the current position of the movable member on the basis of the previous lock detected position in a case where the motor is stopped while the movable member is positioned within the lock detection area, irrespective of the current positional information calculated by the current positional information calculating portion after the motor is started.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

First Embodiment

Figure 1:
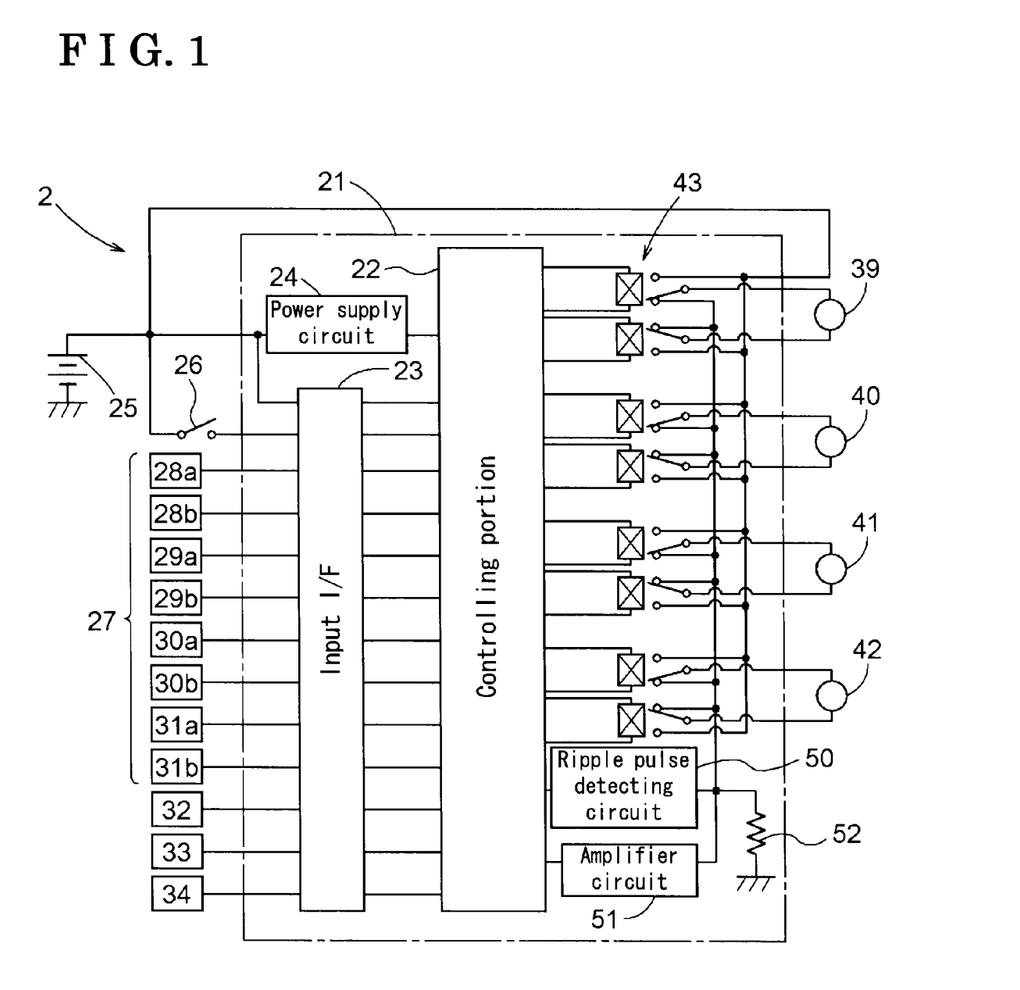
FIG. 1 is a diagram schematically illustrating an entire configuration of a seat position control device.
Figure 10:
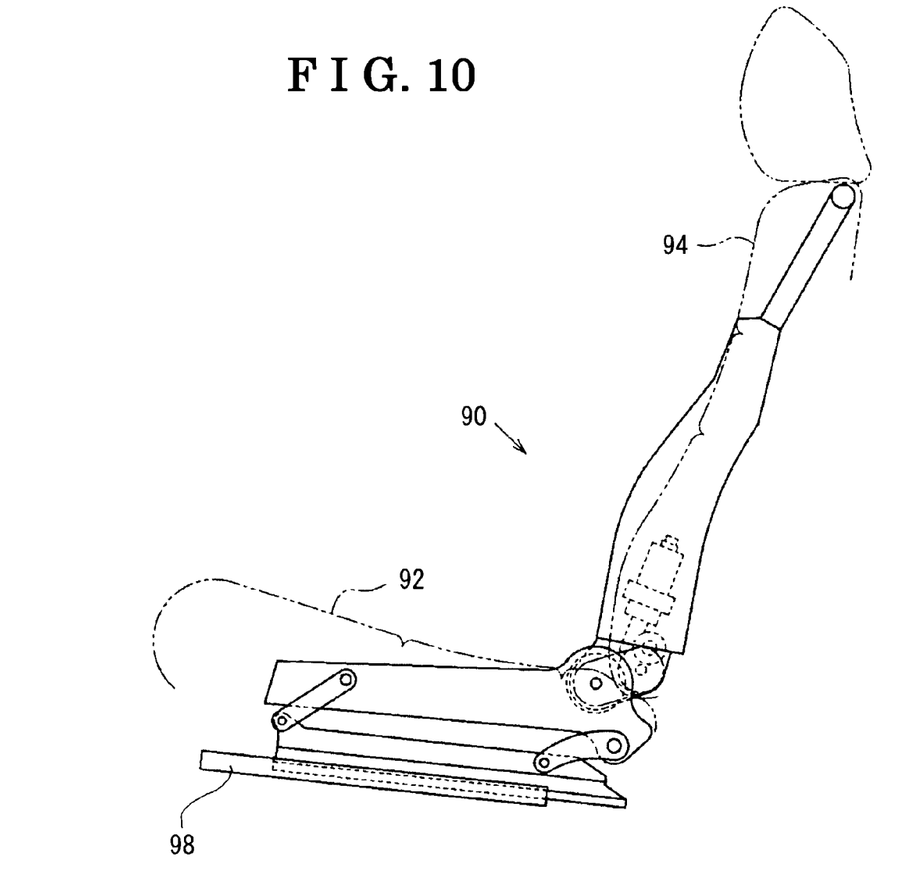
FIG. 10 is an outline view of a seat.

A case where a state memorizing device 1 for a movable member (which will be hereinafter referred to as a state memorizing device 1) is adapted to a seat position control device 2 for adjusting a position of a seat 90 as shown in FIG. 10 (which will be hereinafter referred to as a seat position) for a vehicle will be described below as an example. Illustrated in FIG. 1 is a schematic view illustrating an entire configuration of the seat position control device 2, which controls a position of each portion (a movable body which is also referred to as the movable member) of the seat 90. The seat position control device 2 includes an electronic control unit 21 (which will be hereinafter referred to as an ECU 21) configured by a microcomputer.

The ECU 21 includes a controlling portion 22, which serves as a controlling means. The controlling portion 22 includes various functional portions configuring the state memorizing device 1. Further, the controlling portion 22 is configured so as to include a Read Only Memory (ROM), a Random Access Memory (RAM), a backup Random Access Memory (backup RAM) and the like. The ROM is a memory into which various control programs and a map, referred to when the programs are executed, and the like are memorized. The controlling portion 22 executes a calculation process on the basis of the various control programs, the map and the like memorized in the ROM. The RAM is a memory for temporarily storing therein the calculation result of the controlling portion 22, data inputted from outside and the like. The backup RAM is configured with a non-volatile memory for storing therein the memorized data and the like. The controlling portion 22, the ROM, the RAM and the backup RAM are connected to one another via a bus. Furthermore, the controlling portion 22, the ROM, the RAM and the backup RAM are connected to an input interface 23 and an output interface.

A battery 25 is connected to the controlling portion 22 via a power supply circuit 24 included in the ECU 21. A positive terminal of the battery 25 is connected to the input interface 23 via an ignition switch 26. By turning on the ignition switch 26, a predetermined voltage (e.g. 5V), which is stabilized by the power supply circuit 24, is supplied to each portion of the ECU 21.

An operation switch 27, used when a position of each portion of the seat 90 (i.e. a state of the seat) is adjusted, is connected to the input interface 23 of the controlling portion 22. The operation switch 27 is configured with slide switches 28a and 28b, reclining switches 29a and 29b, front vertical switches 30a and 30b and lifter switches 31a and 31b, and the like.

The slide switches 28a and 28b are operation switches for sliding an entire seat 90 forward and rearward, respectively, along rails 98, which are provided at the vehicle body side. The reclining switches 29a and 29b are operation switches for reclining a seat-back 94, which is supported so as to be rotatable relative to a seat cushion 92, forward and rearward, respectively. The front vertical switches 30a and 30b are operation switches for moving a front portion of the seat cushion 92, on which an occupant is seated, upward and downward, respectively, in a vertical direction relative to the seat 90. The lifter switches 31a and 31b are the operation switches for moving a rear portion of the seat cushion 92, on which the occupant is seated, upward and downward, respectively, in the vertical direction.

In addition to the operation switch 27, for example, memory retrieval switches 32 and 33 and a storage switch 34 are connected to the input interface 23. Each of the memory retrieval switches 32 and 33 functions as a switch for memorizing a seat position for one seat. In other words, according to the seat position control device 2 of the first embodiment, any desired two seat positions are memorizable for one single seat 90. By operating each switch of the operation switch 27, each portion of the seat is adjustable to any desired seat position (i.e. the state of the seat). The adjusted seat position is memorized at the backup RAM. In order to memorize the seat position in the backup RAM either one of the memory retrieval switches 32 or 33 corresponding to the backup RAM, in which the seat position is to be memorized, needs to be pushed together with the storage switch 34. Then, when either one of the memory retrieval switches 32 or 33 corresponding to the backup RAM, in which the seat position is memorized, is pushed afterwards, each portion of the seat 90 is automatically moved (restored) to the memorized position. Additionally, in this embodiment, two memory retrieval switches 32 and 33 are provided, however, the number of the retrieval switches is not limited to two, but any desired number of retrieval switches may be provided.

Each of four motors 39, 40, 41 and 42 is connected to the output interface of the controlling portion 22 via a relay 43. For example, a direct current brush motor is used for each of the motors 39, 40, 41 and 42. The relay 43 is configured with four pairs of relays each of which corresponds to each of the motors 39, 40, 41 and 42, so that each motor is connected to the output interface via the corresponding pair of relays. Each pair of relays is configured with a pair of coils and a pair of switching terminals. For example, when either one of the switches of the operation switch 27 is operated, an electrification of the pair of coils corresponding to the operated switch is controlled by the controlling portion 22. Accordingly, the pair of switching terminals of the corresponding pair of the relays are switched, so that the motor, corresponding to the pair of relays, is independently driven so as to rotate in a normal direction or in a reverse direction, which is a direction opposite to the normal direction.

Accordingly, the slide motor 39 is rotated in the normal direction or in the reverse direction by operating either one of the slide switches 28a or 28b, thereby sliding the entire seat 90 forward or rearward. More specifically, for example, the slide motor 39 is rotated in the normal direction by operation the slide switch 28a, and is rotated in the reverse direction by operation the slide switch 28b. The reclining motor 40 is rotated in the normal direction or in the reverse direction by operating either one of the reclining switches 29a or 29b, thereby reclining the seat-back 94 forward or rearward. The front vertical motor 41 is rotated in the normal direction or in the reverse direction by operating either one of the front vertical switches 30a or 30b, thereby moving the front portion of the seat cushion 92 upward or downward. The litter motor 42 is rotated in the normal direction or in the reverse direction by operating either one of the lifter switches 31a or 31b, thereby moving the rear portion of the seat cushion 92 upward or downward.

The ECU 21 further includes a ripple pulse detecting circuit 50, which serves as a pulse detecting means for pulsing a ripple component included in a motor current flowing through each of the motors 39, 40, 41 and 42 and outputting a ripple pulse synchronized with the rotation of the motor. The ECU 21 also includes an amplifier circuit 51 for amplifying the motor current. A voltage from the battery 25 is divided by a resistor 52 on the basis of impedance of the motor to be actuated, and the divided voltage is inputted into the ripple pulse detecting circuit 50 as a motor rotational signal. Further, the motor current, which is amplified through the amplifier circuit 51, is converted from analogue into digital by an analogue-to-digital (A/D) converter provided to the ECU 21. The converted motor current is inputted into the controlling portion 22. Accordingly, the controlling portion 22 may always detect the motor current of each of the motors 39, 40, 41 and 42. The amplifier circuit 51 and the A/D converter configure a motor current detecting portion for detecting the motor current supplied to the motor.

The ripple pulse detecting circuit 50 includes a switched capacitor filter SCF and a ripple pulse shaping circuit. The motor rotational signal is inputted into the switched capacitor filter SCF. Then, a noise, which exists and being superposed on the motor rotational signal together with the ripple component, is removed by the switched capacitor filter SCF on the basis of a predetermined cut-off frequency.

The ripple pulse shaping circuit includes a low-pass filter LPF (a high frequency active filter), a first differentiating circuit DC1, an amplifier AP, a second differentiating circuit DC2, a comparator CM and the like.

A noise, included in an output signal of the switched capacitor filter SCF, is removed by means of the low-pass filter LPF. The output signal of the switched capacitor filter SCF, whose noise is removed by the low-pass filter LPF, is differentiated by the first differentiating circuit DC1 in order to attenuate a direct-current component, so that a signal only including the ripple component is obtained. By passing the signal only including the ripple component through the second differentiating circuit DC2 after amplifying the signal by the amplifier AP, a signal, whose phase is delayed by 90 degrees relative to the signal including only the ripple component, is obtained. Then, by comparing the output signal of the amplifier AP and the output signal of the second differentiating circuit DC2 at the comparator CM, the ripple pulse, which synchronizes with a rotation of each of the motors 39, 40, 41 and 42 and whose frequency corresponds to a number of rotations (a rotational speed), is obtained.

The ripple pulse, which is detected by the ripple pulse detecting circuit 50, synchronizes with the rotation of each of the motors 39, 40, 41 and 42 and which has the frequency corresponding to the number of rotations, is transmitted to the controlling portion 22 via the output interface.

Figure 2:
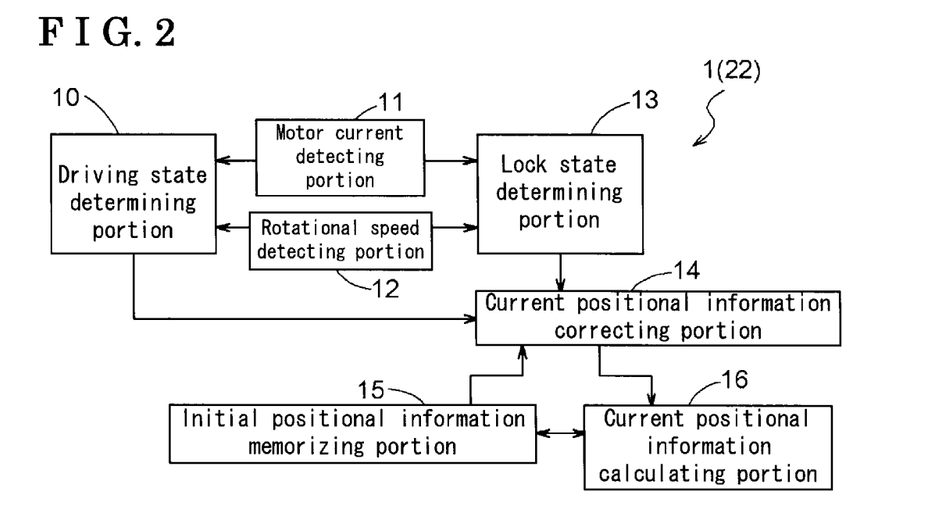
FIG. 2 is a block diagram schematically illustrating a configuration of a state memorizing device for a movable member according to a first embodiment.

Described above is a schematic explanation for an entire configuration of the seat position control device 2. Hereinbelow, the state memorizing device 1, which is adapted to the seat position control device 2, will be described. Illustrated in FIG. 2 is a block diagram schematically illustrating a configuration of the state memorizing device 1.

The state memorizing device 1 serves as a functional block configuring a part of the controlling portion 22. The state memorizing device 1 includes a driving state determining portion 10, a motor current detecting portion 11, a rotational speed detecting portion 12, a lock state determining portion 13, a current positional information correcting portion 14, an initial positional information memorizing portion 15 and a current positional information calculating portion 16. The above-described functional portion of the state memorizing device 1 for executing the various controls for memorizing the state of the seat position is configured by either one of or both of a hardware or/and a software with a central processing unit (CPU) as a memorizing device 1 will be described in more detail.

The motor current detecting portion 11 detects the motor current supplied to each of the motors 39, 40, 41 and 42, each of which adjusts each corresponding portion of the seat. The motor current refers to a current supplied to each of the motors 39, 40, 41 and 42 for driving the same. In other words, the motor current corresponds to a coil current, which flows through the coil wound around a rotor included in each of the motors 39, 40, 41 and 42. As described above, the motor current is amplified at the amplifier circuit 51, and then, the amplified motor current is converted from analogue into digital by the A/D converter, which is provided within the ECU 21. The converted motor current is read into the controlling portion 22. The motor current, read into the controlling portion 22, is transmitted to the motor current detecting portion 11, so that the motor current becomes detectable. The motor current detected by the motor current detecting portion 11 is transmitted to the driving state determining portion 10 and the lock state determining portion 13.

The rotational speed detecting portion 12 detects the rotational speed of each of the motors 39, 40, 41 and 42. As described above, the ripple pulse, whose frequency corresponds to the number of rotations (the rotational speed) of each of the motors 39, 40, 41 and 42, is detected by the ripple pulse detecting circuit 50. The detected ripple pulse is transmitted to the rotational speed detecting portion 12. Accordingly, the rotational speed detecting portion 12 becomes capable of detecting the rotational speed of each of the motors 39, 40, 41 and 42. The rotational speed detected by the rotational speed detecting portion 12 is transmitted to the driving state determining portion 10 and the lock state determining portion 13.

Figure 3:
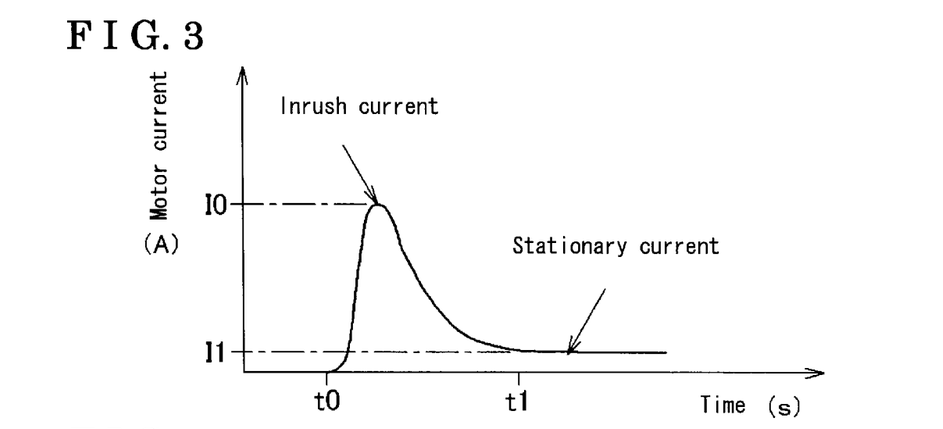
FIG. 3 is a diagram illustrating a relationship between a motor current and time when a motor is started.

The driving state determining portion 10 determines whether or not each of the motors 39, 40, 41 and 42 has just been started, on the basis of the motor current supplied to each motor and the rotational speed of each motor. The motor current is transmitted to the driving state determining portion 10 from the motor current detecting portion 11. The rotational speed is transmitted to the driving state determining portion 10 from the rotational speed detecting portion 12. Illustrated in FIG. 3 is a diagram specifying a relationship between the motor current and time of when the motor is started to rotate. As illustrated in FIG. 3, when the motor is actuated at time t0 (t=t0), an inrush current flows through the motor when the motor has just been started. Then, when a time passes (t>t1) and the motor shifts to a stationary actuated state, the motor current becomes a stationary current. The motor current reaches a maximum value I0 (i.e. a peak motor current value I0) just after the motor is started and while the inrush current flows through the motor. A value of the stationary motor current, flowing through the motor, is referred to as a bottom peak motor current value I1. In a case where a difference between the peak motor current value I0 of the inrush current and the bottom peak motor current value I1 of the stationary current is equal to or greater than a predetermined value (however, the peak motor current value I0 is determined to be always greater than the bottom peak motor current value I1 (i.e. I0>I1)), and in a case where the motor does not rotate just before the inrush current I0 flows therethrough, it is determined that the motor has just started. The driving state determining portion 10 determines whether or not each of the motors 39, 40, 41 and 42 has just been started, as described above.

Further, the driving state determining portion 10 determines whether or not each of the motors 39, 40, 41 and 42 is stopped, on the basis of the motor current supplied to the motor and the rotational speed of the motor. Even in this case, the motor current is transmitted to the driving state determining portion 10 from the motor current detecting portion 11. Further, the rotational speed is transmitted to the driving state determining portion 10 from the rotational speed detecting portion 12. In a case where the motor current is zero (0) and in a case where the rotational speed is zero (0), the driving state determining portion 10 determines that each of the motors 39, 40, 41, 42 is stopped. The determination result is transmitted to the current positional information correcting portion 14.

The initial positional information memorizing portion 15 memorizes information relating to a positional information (which will be hereinafter referred to as an initial positional information) indicative of a current position (a present position) of the movable member of before each of the motors 39, 40, 41 and 42 is started (i.e. a then-current position of the movable member). The seat 90 is adapted as the movable member in this embodiment. Hence, in this embodiment, the initial positional information refers to information indicative of the current position of the seat 90 before each of the motors 39, 40, 41 and 42 is started. As described above, the seat 90 is operated so as to slide (slide movement), recline (recline movement), move upward and downwards at the front portion of the seat cushion 92 (front vertical movement) and so as to move upward and downward at the rear portion of the seat cushion 92 (lifter movement). Therefore, the initial positional information is the information indicative of the position of the seat 90 within a range of movement within which each movement is achievable. As each movement is achieved by substantially the same process, the above-described movement will be described below with reference to the slide movement as an example. Additionally, the movable member refers to the seat cushion 92 in the description below.

Figure 4:
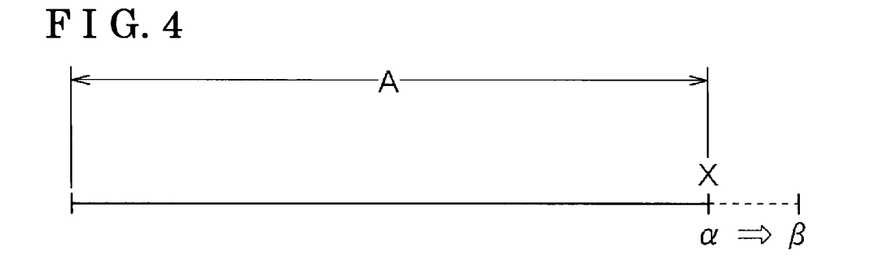
FIG. 4 is a diagram schematically illustrating a slide range.

Illustrated in FIG. 4 is a diagram for explaining a slide range. The seat 90 slides by using a rotational power of the slide motor 39 (i.e. the slide movement). A maximum slide amount of when the seat 90 is slid corresponds to a range of movement A. If the seat 90 is positioned at a position α in FIG. 4 before the slide motor 39 is started, the initial positional information memorizing portion 15 memorizes the initial positional information indicating that the seat 90 is positioned at the position α before the slide motor 39 is started.

The current positional information calculating portion 16 calculates a current positional information indicative of the current position of the movable member, whose position changes in response to the actuation of each of the motors 39, 40, 41 and 42, on the basis of the position (the then-current position of the seat 90) indicated by the initial positional information and the motor current. In other words, the current positional information calculating portion 16 calculates the current positional information indicative of the current position of the seat 90, whose position changes in response to the actuation state of each of the motors 39, 40, 41 and 42, on the basis of the position indicated by the initial positional information and the motor current. The initial positional information is transmitted to the current positional information calculating portion 16 form the initial positional information memorizing portion 15. The calculation for obtaining the current positional information is executed by using the ripple pulse, which is transmitted to the current positional information calculating means 16 from the ripple pulse detecting circuit 50. However, because the known calculation for obtaining the current positional information using the ripple pulse is adapted, the detailed explanation will be omitted. The current positional information calculating portion 16 calculates the current positional information on the basis of the position indicated by the initial positional information and the motor current.

In this embodiment, the motor refers to the slide motor 39. Accordingly, the current positional information calculating portion 16 calculates the current positional information indicative of the current position of the seat cushion 92, whose position changes in the actuation state of the slide motor 39, on the basis of the position indicated by the initial positional information and the motor current. In a case where the seat cushion 92 is moved from the position α to a position β, as illustrated in FIG. 4, the current positional information calculating portion 16 calculates the current positional information on the basis of the initial positional information indicating that the seat cushion 92 was positioned at the position α and the motor current necessary for moving the seat cushion 92 to the point β, in order to correlate the position to be memorized in the ECU 21 as the current position of the seat cushion 92 to the actual current position of the seat cushion 92.

As described above, the slide range corresponds to the range of movement A. However, the seat cushion 92 may be moved to the position β. This is because, in a case where the slide motor 39 is actuated so as to move the seat cushion 92 further in end point direction even if the seat cushion 92 is stopped at the position α, corresponds to the end point X of the range of movement A, the slide more 39 is further rotated than an actuation amount corresponding to the range of movement A, because of backlash of a gear for moving the seat 90, deflection of a shock absorbing member provided at the end point X for absorbing a shock generated when the seat 90 contacts the end point X and the like. Even in the case where the motor is farther rotated than the actuation amount corresponding to the range of movement A, the current positional information calculating portion 16 accurately calculates the current positional information of the seat 90. The calculated current positional information of the seat 90 is used as an initial positional information when the motor is started next time.

Figure 5:
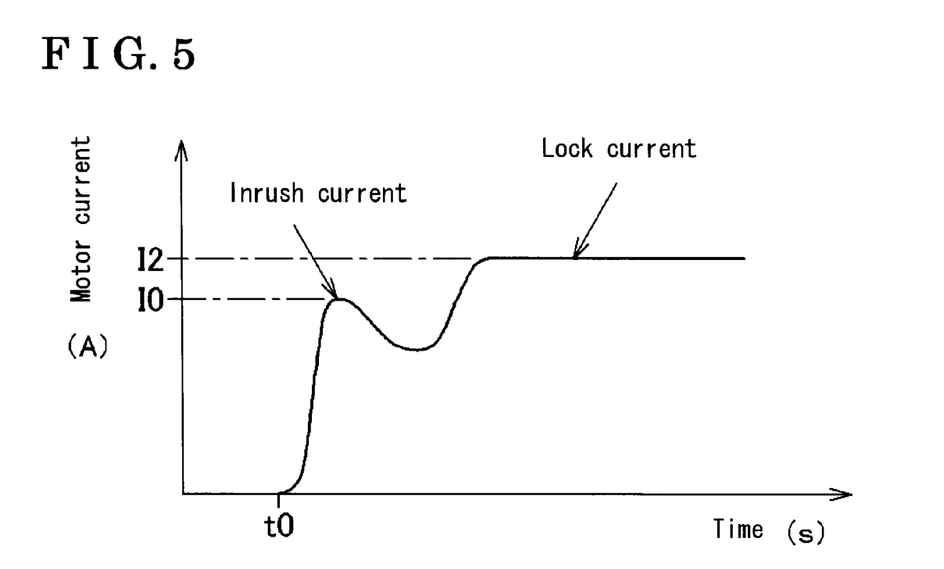
FIG. 5 is a diagram illustrating an inrush current and a lock current.

The lock state determining portion 13 determines whether or not the seat 90, which is driven by each of the motors 39, 40, 41 and 42, is in a locked state, on the basis of the motor current supplied to each of the motors 39, 40, 41 and 42. The motor current is transmitted to the lock state determining portion 13 from the motor current detecting portion 11. Further, the rotational speed is transmitted to the lock state determining portion 13 from the rotational speed detecting portion 12. The locked state refers to a state where the motor is locked by corresponding portion of the seat 90 contacting a stopper and the like at the end point X of the range of movement A. When the motor is turned to be in the locked state, a lock current is supplied to the motor, as illustrated in FIG. 5. The lock current is a current flowing through the motor at a greater value I2 (i.e. a lock current value I2) than the peak motor current value I0 in the case where the motor is driven at time t0 (t=t0). Therefore, in a case where a difference between the peak motor current value I0 and the lock current value I2 is equal to or greater than a predetermined value (however, the lock current value I2 is determined to be always greater than the peak motor current value I0 (i.e. I2>I0)), and in the case where the motor is rotated at a very low speed (i.e. a very low speed rotational state in which the rotational speed of the motor is equal to or less than a predetermined value), the lock state determining portion 13 determines that the motor is in the locked state.

The very low speed rotational state refers to a state where the ripple component of the motor current is not accurately pulsed by the ripple pulse detecting circuit 50 and therefore, the motor rotates at such a low speed that the ripple pulse is not accurately detected. The lock state determining portion 13 determines whether or not the seat 90 is in the locked state, as described above. The determination result is transmitted to the current positional information correcting portion 14.

The current positional information correcting portion 14 determines the current position of the seat 90 on the basis of the initial positional information (i.e. the current positional information correcting portion 14 corrects the current position of the seat cushion 92 to be memorized so as to accurately correlate (correspond to) the current position of the seat cushion 92 to be memorized and the actual current position of the seat cushion 92 set by the user), when the lock state determining portion 13 determines that the seat cushion 92 is in the locked state after the slide motor 39 has just been started and the electrification of the slide motor 39 is stopped, without being influenced by the current positional information calculated by the current positional information calculating portion 16 after the slide motor 39 is started. It is determinable whether or not the slide motor 39 has just been started on the basis of the determination result transmitted to the current positional information correcting portion 14 from the driving state determining portion 10. It is determinable whether or not the seat cushion 92 is in the locked state on the basis of the determination result transmitted to the current positional information correcting portion 14 from the lock state determining portion 13. Further, it is determinable whether or not the electrification of each of the motors 39, 40, 41 and 42 is stopped on the basis of the determination result transmitted to the current positional information correcting portion 14 from the driving state determining portion 10.

The current positional information correcting portion 14 determines the current position of the seat cushion 92 on the basis of the initial positional information when the driving state determining portion 10 determines that the slide motor 39 has just been started and when the lock state determining portion 13 determines that the seat cushion 92 is in the locked state on the basis of the above-mentioned determination results and the electrification of the slide motor 39 is stopped, without being influenced by the current positional information calculated by the current positional information calculating portion 16 after the slide motor 39 is started. In other words, the current position of the seat 90 is updated by using the initial positional information. Then, the determined current position of the seat cushion 92 is used as the initial positional information for when the motor is actuated next time. In this case, only the current positional information is updated in order to correlate the current seat position memorized in the ECU 21 to the actual current seat position set by the user, and a process for moving each portion of the seat 90 is not executed.

Accordingly, the state memorizing device 1 determines the current position of the seat 90 on the basis of the initial positional information in the case where the locked state of the seat cushion 92 is detected after the slide motor 39 has just been started, without being influenced by the current positional information calculated after each of the motors 39, 40, 41 and 42 is started. Accordingly, in the case where each of the motors 39, 40, 41 and 42 further rotates so as to move the seat 90 exceeding the end point (i.e. in the case where each of the motors 39, 40, 41 and 42 is further rotated so as to exceed the actuation amount corresponding to the range of movement A) when the movable portion of the seat 90 is positioned at the end point X of the range of movement A, and in the case where a displacement occurs between the actual current position of the movable member of the seat 90 and the current positional information memorized at the ECU 21 because a displacement occurring between the then-current position of the movable member of the seat 90 and the initial positional information, the state memorizing device 1 appropriately corrects the current positional information to be memorized. As a result, the state memorizing device 1 accurately controls adjustments of the seat position that follow.

Figure 6:
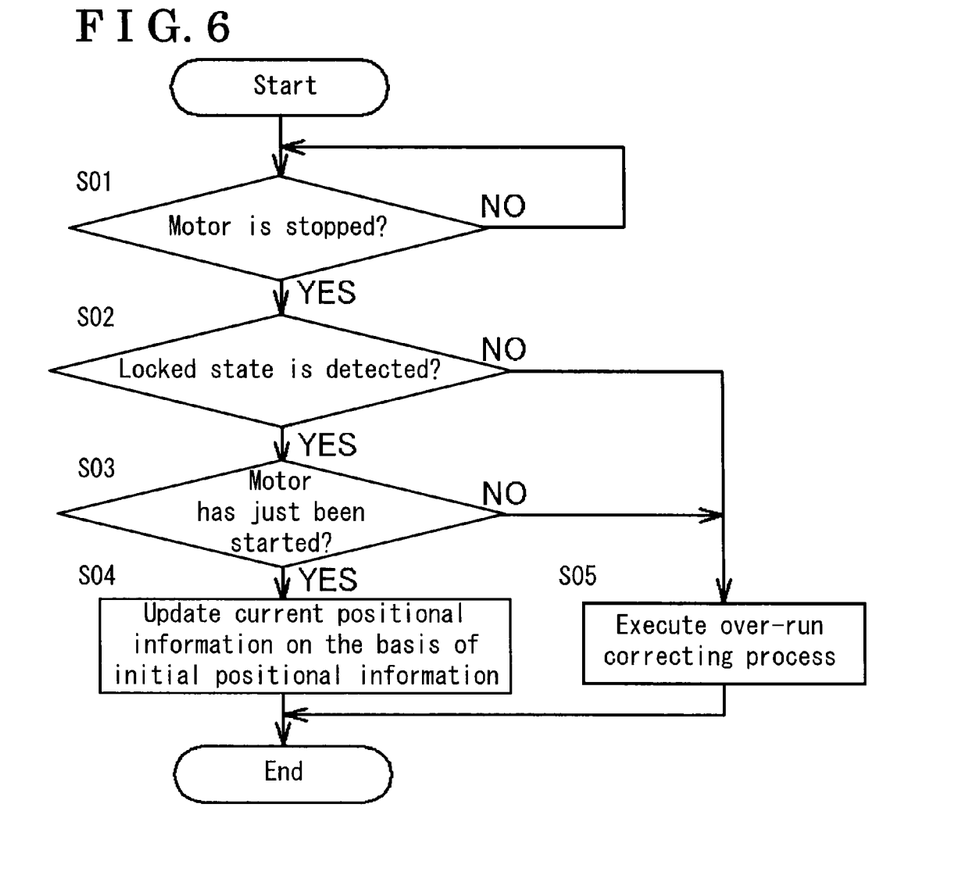
FIG. 6 is a flowchart relating to a process according to the first embodiment.

The process executed by the state memorizing device 1 will be described below in accordance with a flowchart. Here, as is the case described above, the slide movement is used as an example. Illustrated in FIG. 6 is a flowchart relating to the process executed by the state memorizing device 1 of the first embodiment. The driving state determining portion 10 checks whether or not the slide motor 39 is in the stopped state. If the slide motor 39 is not in the stopped state, the process is suspended (Step S01: No). In the case where the slide motor 39 is in the stopped state (Step S01: Yes), and in the case where the lock state determining portion 13 determines the locked state of the seat cushion 92 (Step S02: Yes), the state memorizing device 1 checks whether or not the slide motor 39 had just been started.

In the case where the slide motor 39 had just been started (Step S03: Yes), the current positional information correcting portion 14 updates the current position of the seat cushion 92 on the basis of the initial positional information stored at the initial positional information memorizing portion 15, without being influenced by the current positional information calculated by the current positional information calculating portion 16 (Step S04).

In the case where the lock state determining portion 13 does not detect the lock state of the seat cushion 92 in Step S02 (Step S02: No), or in the case where the driving state determining portion 10 does not detect that the slide motor 39 has just been started in Step S03 (Step S03: No), the current positional information correcting portion 14 executes over-run correction to the current positional information calculated by the current positional information calculating portion 16 (Step S05). An explanation of the over-run correction will be given below. The seat 90 may move by inertia (i.e. the seat 90 may over-run) in the case where the seat 90 is not in the locked state after the motor is stopped. The displacement may occur between the position obtained by the current positional information calculating portion 16 and the actual position because of the above-mentioned movement by the inertia. Accordingly, a process for correcting the positional displacement by the over-run (i.e. the over-run correction) is executed. By correcting the positional displacement, occurring after the slide motor 39 has just been started, by the process for the over-run correction, accurate current information of the current position of the seat 90 is obtained.

Second Embodiment

In the state memorizing device 1 of the first embodiment, the current position of the seat 90 is determined on the basis of the initial positional information in the case where the locked state of the seat 90 is detected after the motor has just been started, without being influenced by the current positional information calculated by the current positional information calculating portion 16 after each of the motors 39, 40, 41 and 42 is started to be activated. On the other hand, the state memorizing device 1 of a second embodiment is capable of obtaining accurate information relating to the current position of the seat 90 even if the locked state of the seat 90 is detected not after the motor has just been started. Hereinbelow, the detailed explanation about the processes for obtaining the accurate information relating to the seat position of the seat 90 according to the second embodiment will be given.

Figure 7:
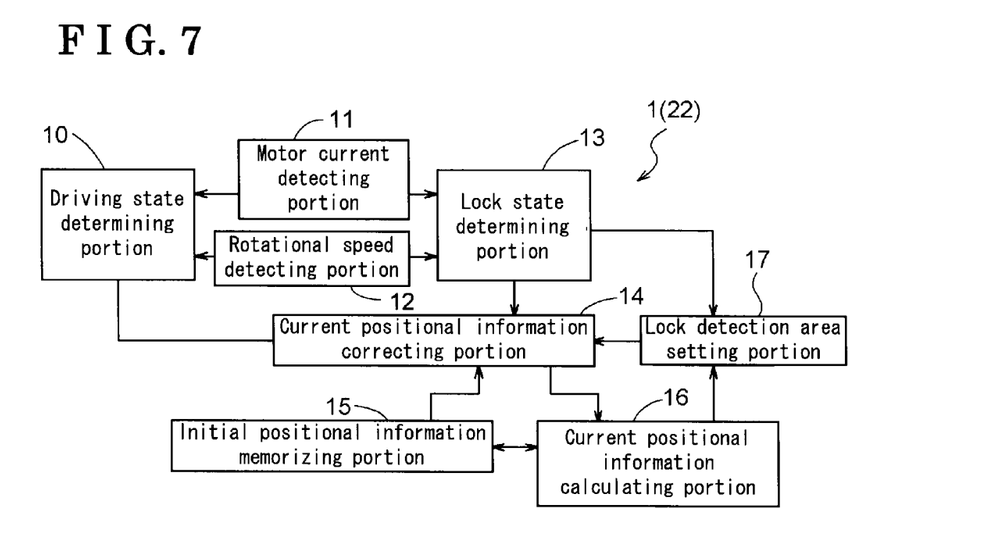
FIG. 7 is a block diagram schematically illustrating a configuration of a state memorizing device for a movable member according to a second embodiment.

Illustrated in FIG. 7 is a block diagram schematically illustrating a configuration of the state memorizing device 1 relating to the second embodiment. The state memorizing device 1 of the second embodiment differs from the state memorizing device 1 of the first embodiment, whose configuration is schematically illustrated in FIG. 2, in that the state memorizing device 1 includes a lock detection area setting portion 17. The state memorizing device 1 of the second embodiment includes the same functional portions as the state memorizing device 1 of the first embodiment, except for the lock detection area setting portion 17, therefore, the detailed explanation about the same functional portions will be omitted. In the case where the locked state of the seat 90 is detected, the lock detection area setting portion 17 sets a lock detection area within the range of movement A of the seat 90 so that the lock detection area has a predetermined distance relative to at least a back range with reference to a position at which the locked state of the seat 90 is detected (i.e. a lock detected position, where the seat 90 is mechanically locked). More specifically, the back range refers to a range set at a rearward direction (i.e. a rearward portion within the lock detection area) with reference to the lock detected position, at which the movable member of the seat 90 is mechanically locked, relative to the vehicle body (i.e. in a front-rear direction of the vehicle body). The locked state of the seat 90 is detected by the lock state determining portion 13. Additionally, a term "a front range relative to the vehicle body (i.e. in the front-rear direction of the vehicle body)" refers to a range within the lock detection area relative to the lock detected position in the front-rear direction.

Figure 8:
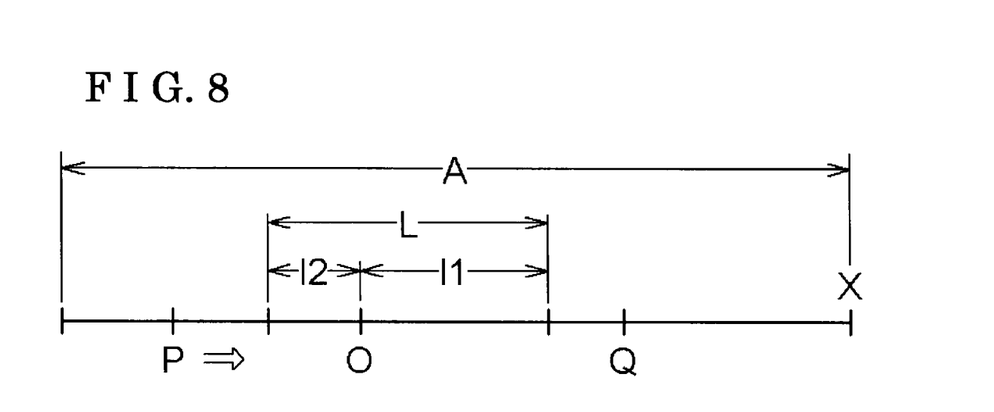
FIG. 8 is a diagram schematically illustrating a lock detection area.

The setting of the lock detection area will be explained in detail with reference to FIG. 8. A range within which the seat cushion 92 is movable and corresponds to the range of movement A. An end portion of the range of movement A is indicated by the end point X. In the case where the lock state determining portion 13 detects the locked state of the seat cushion 92 at a position O (which will be hereinafter referred to as a lock detected position O) because, for example, an object (e.g. a stone) is caught between the seat cushion 92 and the slide rail and the like, the lock detection area setting portion 17 sets a lock detection area L, which includes a first range l1, corresponding to the back range within the lock detection area L in the front-rear direction and a second range l2, corresponding to the front range within the lock detection area L in the front-rear direction, with reference to the position O (i.e. the lock detected position O). The first and second ranges l1 and l2 may be defined by a number of counts (i.e. the number of ripple pulses synchronized with the rotation of the motor) by a counter. Alternatively, the first and second ranges l1 and l2 may be defined by time the motor actually rotates after the motor current is stopped being supplied thereto, in other words, the first and second ranges l1 and l2 may be defined by time necessary for the motor to actually stop being rotated after the motor current is cut. Further, the first and second ranges l1 and l2 do not need to be set to have the same range (the number of counts, time or the like), but the first and second ranges l1 and l2 may be set so as to differ from each other, as illustrated in FIG. 8.

The current positional information correcting portion 14 determines the current position of the seat cushion 92 on the basis of the previous lock detected position in a case where the seat cushion 92 moves into the lock detection area L from an outside thereof and in a case where the slide motor 39 is stopped within the back range in the front-rear direction within the lock detection area L, without being influenced by the current positional information calculated by the current positional information calculating portion 16 after the slide motor 39 has just been started. As described above, the lock detection area setting portion 17 sets the lock detection area L with reference to the previous lock detected position. Information indicative of the lock detection area L is transmitted to the current positional information calculating portion 16. The slide motor 39 may be stopped when the seat cushion 92 turns to be in the locked state. Alternatively, the slide motor 39 may be stopped when a user turns off the operation switch.

The movement of the movable member from outside of the lock detection area L refers to, for example, a movement of the movable member towards a direction, which is indicated by a hollow arrow, from a position outside of the lock detection area L (e.g. a point P). The back range in the front-rear direction within the lock detection area L refers to the first range 11. It is determinable whether or not the seat cushion 92 moves into the lock detection area L from the outside thereof, on the basis of the initial positional information, which is transmitted to the current positional information calculating portion 16 from the initial positional information memorizing portion 15, and the lock detection area L. The current positional information correcting portion 14 determines the current position of the seat cushion 92 (i.e. the current positional information correcting portion 14 corrects the information indicative of the current position of the seat cushion 92 to be memorized so as to be correlated to the actual current position of the seat cushion 92) on the basis of the previous lock detected position, in the case where the seat 90 moves into the lock detection area L from the outside thereof (e.g. from the point P) and in the case where the slide motor 39 is stopped while the seat cushion 92 is positioned within the first range 11, without being influenced by the current positional information calculated by the current positional information calculating portion 16 after the slide motor 39 is actuated. The current position, which is determined by the current positional information correcting portion 14 and which is indicated by the current positional information, is used as the initial positional information when the motor is actuated next time. In a case where the locked state of the seat cushion 92 is detected at the front range in the front-rear direction within the lock detection area L, i.e. within the second range 12, in FIG. 8, the current information correcting portion 14 does not determine the current position included in the current positional information on the basis of the previous lock detected position, but the current information correcting portion 14 may determine the current position of the seat cushion 92 on the basis of the current positional information obtained by the current positional information calculating portion 16 after the slide motor 39 is actuated.

Further, in a case where the seat cushion 92 is detected to be in the locked state at a position outside of the lock detection area L, the lock detection area setting portion 17 updates the lock detection area L on the basis of the lock detected position. The detection of the locked state of the seat cushion 92 is determinable on the basis of the determination result transmitted from the lock state determining portion 13 to the lock detection area setting portion 17. The position, at which the locked state of the seat cushion 92 is detected corresponds to the updated current positional information, which is memorized at the current positional information calculating portion 16. The updated current positional information is transmitted to the lock detection area setting portion 17 from the current positional information calculating portion 16. The lock detection area setting portion 17 newly sets the lock detection area L. The newly set lock detection area L is used when the seat is moved next time. The state memorizing device 1 may be modified so as to update the lock detection area L in the case where the locked state of the movable member is detected at positions outside of the lock detection area L and so as not to update the lock detection are L in the case where the locked state of the movable member is detected within the second range 12.

The lock detection area setting portion 17 clears the lock detection area L, which is stored in the lock detection area setting portion 17, in the case where the motor is actuated so as to move the seat 90 exceeding the back range in the front-rear direction within the lock detection area L. The back range in the front-rear direction within the lock detection area L corresponds to the first range 11. In a case where, for example, the seat cushion 92 is moved to a point Q so as to exceed the first range 11 within the lock detection area L, which is set before the seat 90 is moved, as illustrated in FIG. 8, the lock detection area setting portion 17 clears the memorized lock detection area L. In this case, if the seat cushion 92 is stopped in the locked state at the point Q, the lock detection area setting portion 17 newly sets the lock detection area L with reference to the point Q. On the other hand, if the seat cushion 92 is stopped at the point Q but not in the locked state, the lock detection area setting portion 17 only clears the set lock detection area L and does not set the lock detection area L again until the locked state is detected next time.

Figure 9:
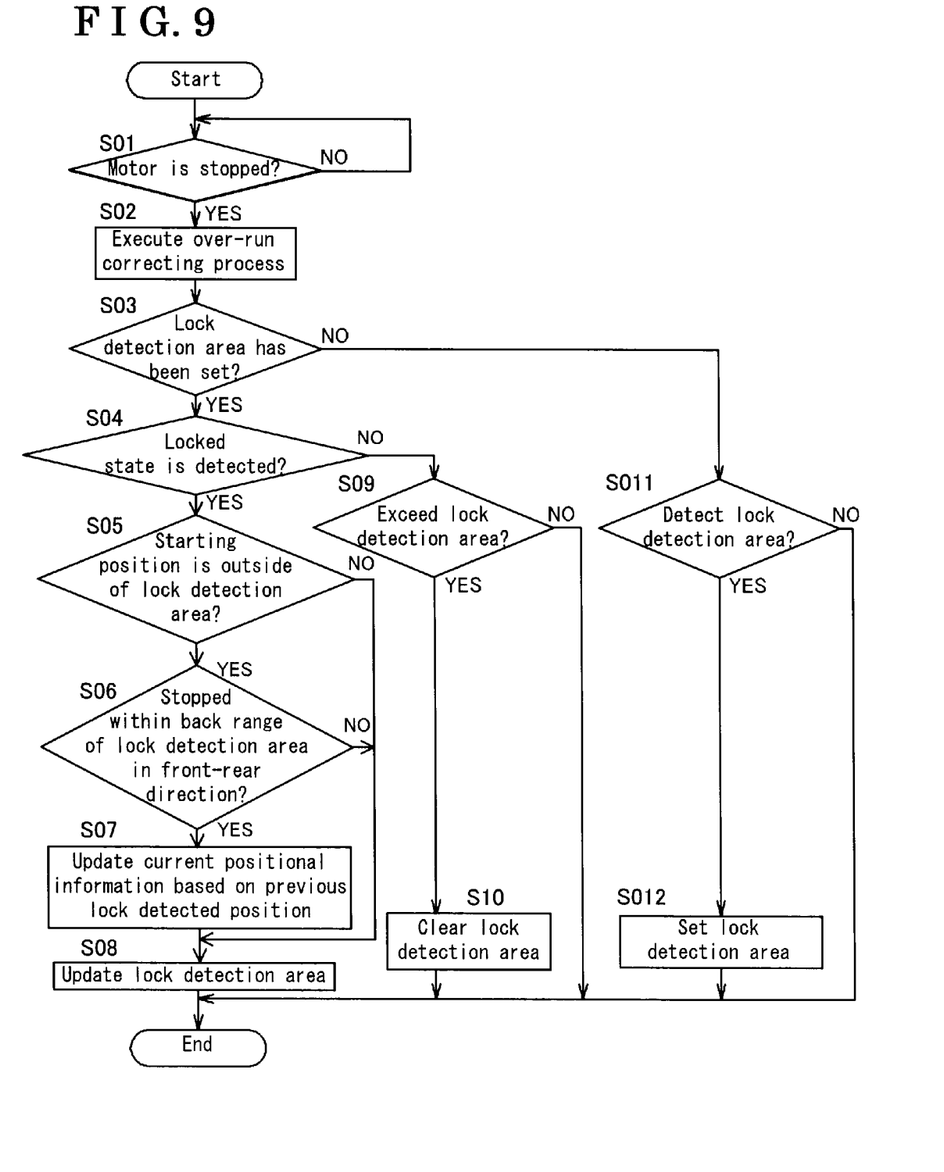
FIG. 9 is a flowchart relating to a process of the second embodiment.

The process executed by the state memorizing device 1 of the second embodiment will be explained in accordance with a flowchart. Illustrated in FIG. 9 is a flowchart relating to the process executed by the state memorizing device 1 of the second embodiment. Here, the seat cushion 92 is used as an example of the movable member, and the slide movement is used as an example for explaining the process executed by the state memorizing device 1 of the second embodiment. The driving state determining portion 10 checks whether or not the slide motor 39 is in the stopped state. In the case where the slide motor 39 is not in the stopped state, the process is suspended (Step S101: No). On the other hand, in the case where the slide motor 39 is in the stopped state (Step S101: Yes), the current positional information correcting portion 14 executes the over-run correcting process to the current positional information stored in the current positional information calculating portion 16 (Step S102). The over-run correcting process executed in the second embodiment is the same as the over-run correcting process executed in the first embodiment. Therefore, the detailed explanation about the over-run correcting process will be omitted.

Following the step S102, the state memorizing device 1 checks whether or not the lock detection area L is set by the lock detection area setting portion 17. In the case where the lock detection area L is set (Step S103: Yes) and in the case where the lock state determining portion 13 detects the locked state of the seat cushion 92 (Step S104: Yes), the state memorizing device 1 checks whether or not the movable member, which is in the locked state, was moved from the outside of the lock detection area L (i.e. whether or not a starting position of the movable member, which is in the locked state, was positioned outside of the lock detection area L). If the starting position (i.e. an initial position) of the seat 90 is located outside the lock detection area L (Step 105: Yes), the state memorizing device 1 checks whether or not the current lock detected position is detected within the first range 11 corresponding to the back range in the front-rear direction within the lock detection area L, in other words, the state memorizing device 1 checks whether or not the subject movable member is stopped within the first range 11 of the back range in the front-rear direction within the lock detection area L. In the case where the current lock detected position is detected within the first range l1 corresponding to the back range in the front-rear direction, in other words, in the case where the subject movable member is stopped within the first range l1 corresponding to the back range in the front-rear direction (Step S106: Yes), the current positional information correcting portion 14 updates the current positional information so that the lock detected position is determined as the current position (Step S107).

Then, the lock detection area setting portion 17 updates the lock detection area L on the basis of the lock detected position (Step S108), and the state memorizing device 1 ends the process. Additionally, even in the case where the subject movable member moves into the lock detection area L not from outside of the lock detection area L (Step S105: No) or in the case where the subject movable member is stopped at outside of the first range l1 corresponding to the back range in the front-rear direction in Step S106 (Step S106: No), the lock detection area setting portion 17 updates the lock detection area L on the basis of the lock detected position (Step S108), and then, the state memorizing device 1 ends the process.

In the case where the lock state determining portion 13 does not detect the locked state of the seat cushion 92 in step S104 (Step S104: No), the state memorizing device 1 checks whether or not the seat cushion 92 is moved so as to exceed the lock detection area L. In the case where the seat cushion 92 is moved so as to exceed the lock detection area L (Step S109: Yes), the lock detection area setting portion 17 clears the currently set lock detection area L (Step S110). Then, the state memorizing device 1 ends the process.

In a case where the lock detection area L is not set in Step S103 (Step S103: No), the state memorizing device 1 checks whether or not the locked state of the seat cushion 92 is detected by the lock state determining portion 13. In the case where the lock state determining portion 13 detects the locked state of the seat cushion 92 (Step S111: Yes), the lock detection area setting portion 17 sets the lock detection area L on the basis of the lock detected position, at which the locked state of the seat cushion 92 is detected, (Step S112). Then, the state memorizing device 1 ends the process. On the other hand, in the case where the lock state determining portion 13 does not detect the locked state of the seat cushion 92 (Step S111: No), the state memorizing device 1 ends the process. Accordingly, the state memorizing device 1 obtains accurate current positional information by using the lock detection area L.

Other Embodiments

In the above-described embodiments, an actuation of the slide motor 39 in the case where the seat cushion 92 is determined to be in the locked state is not described. A motor controlling portion for controlling the slide motor 39 may be configured so as to control the slide motor 39 to stop in the case where the seat cushion 92 is determined to be in the locked state. By configuring the motor controlling portion as above, unnecessary consumption of battery power may be prevented.

Alternatively, the motor controlling portion may be modified so as to continuously drive the slide motor 39 for at least a predetermined minimum actuation amount, even in the case where the user consciously turns off the operation switch for driving the slide motor 39 while recognizing that the seat cushion 92 turns in the locked state. In other words, the minimum actuation amount is preliminarily set, so that the motor controlling portion controls the slide motor 39 to be continuously driven for at least the minimum actuation amount, even if the user consciously turns off the operation switch (i.e. either one of the slide switched 28a and 28b) for driving the slide motor 39 while recognizing that the seat cushion 92 turns in the locked state. The minimum actuation amount may be defined by a detection value of the counter, or by an actuation time of the slide motor 39. Accordingly, the locked state of the movable member (i.e. the seat cushion 92 in this embodiment) is further accurately detected. When the operation switch for driving the corresponding motor is turned off after the inrush current is detected but before the motor current reaches the lock current value I2 to become the lock current in FIG. 5, the lock current is not detected. Therefore, by configuring the motor controlling portion so as to continuously drive the motor for the minimum actuation amount, by preliminarily setting the minimum actuation amount, the lock current is detected even if the operation switch for driving the corresponding motor is turned off after the inrush current is detected but before the motor current reaches the lock current value I2 to become the lock current.

Different minimum operation amounts are set for the first range l1 corresponding to the back range in the front-rear direction within the lock detection area L and the second range l2 corresponding to the front range in the front-rear direction, respectively. Alternatively, the same minimum operation amount is used for both of the first and second ranges l1 and l2.

In the first embodiment, the state memorizing device 1 determines the current position of the seat 90 on the basis of the initial positional information, in the case where the seat 90 is determined to be in the locked state after the motor has just been started and the electrification of the motor is stopped, without being influenced by the current positional information calculated by the current positional information calculating portion 16 after the motor is actuated. Further, in the second embodiment, the state memorizing device 1 determines the current position of the seat 90 on the basis of the initial positional information in the case where the seat 90 moved into the lock detection area L from the outside thereof and in the case where the motor is stopped while the seat 90 is positioned within the back range in the front-rear direction within the lock detection area L, without being influenced by the current positional information calculated by the current positional information calculating portion 16 after the motor is started. However, for example, the state memorizing device 1 may be modified so as to update the current positional information on the basis of the lock detected position in the case where the lock detection area L is set while it is determined that the seat 90 is in the locked state after the motor has just been started.

In the second embodiment, the lock detection area L is updated on the basis of the lock detected position, in the case where the locked state of the seat 90 is detected at positions outside of the lock detection area L. However, the state memorizing device 1 is not limited to the above-described configuration. For example, the state memorizing device 1 may be modified so as not to update the lock detection area L in the case where the locked state of the seat 90 is detected within the lock detection area L.

In the second embodiment, the current positional information is updated on the basis of the lock detected position in the case where the locked state of the seat 90, which is moved into the lock detection area L from the outside thereof, is detected. However, the state memorizing device 1 is not limited to the above-described configuration. For example, the state memorizing device 1 may be modified so as to update the current positional information on the basis of the lock detected position in the case where the locked state of the seat 90 is detected even in the case where the seat 90 is moved within the lock detection area L.

In the second embodiment, the current positional information is updated on the basis of the lock detected position, in the case where the locked state of the seat 90, which is moved into the lock detection area L from the outside thereof, is detected within the first range l1 corresponding to the back range in the front-rear direction. However, the state memorizing device 1 is not limited to the above-described configuration. For example, the state memorizing device 1 may be modified so as to update the current positional information on the basis of the lock detected position even in the case where the locked state of the seat 90 is detected while the seat 90 is positioned within the second range l2 corresponding to the front range in the front-rear direction.

In the above-described embodiments, the seat 90 is used as an example of the movable member. More specifically, in the above-described embodiment, each component of the seat 90, such as the seat cushion 92, the seat-back 94 and the like, is adapted as an example of the movable member. However, the movable member is not limited to the seat 90. For example, a sunroof, a window glass, a door or the like may be adapted as the movable member. Additionally, any members, which are moved by a motor, are adapted as the movable member.

In the above-described embodiment, the slide movement of the seat 90 is described as an example. However, the processes described above are not limited to the slide movement of the seat 90, but the above-described processes are adaptable to the reclining movement, the front vertical movement, the lifter movement and the like.

Accordingly, the current position of the seat 90 is determined on the basis of the initial positional information, in the case where the seat 90 turns to be in the locked state after the motor has just been started even if the difference occurs between the current position of the seat 90, which is calculated in response to an actuation of the motor and which is to be memorized at the ECU 21, and the actual current position of the seat 90 after the electrification of the motor is stopped, without being influenced by the current positional information calculated by the current positional information calculating portion 16 after the motor is started. Accordingly, even in a case where the motor is re-electrified in order to move the seat 90, the position control of the seat 90 is accurately executed.

According to the embodiments, each of the, motors 39, 40, 41, and 42 is continuously driven at least for the minimum actuation amount, which is preliminarily set, even in the case where the operation switch 27 for driving the corresponding motor is turned off.

Accordingly, even in the case where the user turns off the operation switch for driving the corresponding motor, the locked state of the seat 90 is accurately detected because the motor is continuously driven for the minimum actuation amount, which results in enhancing an accuracy in detecting the position of the seat 90, which is in the locked state.

Accordingly, even in the case where the locked state of the seat 90 is not detected after the motor has just been started, the current position of the seat 90 to be memorized is determined on the basis of the previous lock detected position by using the lock detection area L, which is preliminarily set, without being influenced by the current positional information calculated after the motor is started. Accordingly, the accurate current positional information is obtained, therefore, the position control on the seat 90 is accurately executed even in the case where the seat 90 is re-electrified in order to move the seat 90.

According to the embodiment, the current positional information correcting portion 14 determines the current position of the seat 90 on the basis of the initial positional information in a case where the seat 90 is moved into the lock detection area L from outside thereof.

According to the embodiments, the lock detection area L is cleared in a case where each of the motors 39, 40, 41, and 42 is driven so as to move the seat 90 to exceed the lock detection area L set at the rear side in the front-rear direction with reference to the lock detected position.

Accordingly, the determination of whether or not the seat 90 is in the locked state within the lock detection area L does not need to be executed in the case where the motor is re-actuated, because the locked position, at which the seat 90 turns to be in the locked state, does not exist within the lock detection area L. Accordingly, a calculation load is reduced.

According to the embodiments, the lock detection area L is updated on the basis of the lock detected position in a case where the lock state of the seat 90 is detected at a position outside of the lock detection area L.

Accordingly, the lock position, at which the seat 90 is possibly turned to be in the locked state in the case where the motor is re-actuated, is appropriately estimated.

According to the embodiments, the seat cushion 92 is adapted as the movable member.

According to the embodiments, the seat-back 94 is adapted as the movable member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A state memorizing device for a movable member, comprising:
  a lock state determining portion for determining whether or not the movable member, which is driven by a motor, is in a locked state, on the basis of a motor current supplied to the motor;
  an initial positional information memorizing portion for memorizing an initial positional information indicative of a current position of the movable member before the motor is started;
  a current positional information calculating portion for calculating a current positional information indicative of the current position of the movable member on the basis of the position indicated by the initial positional information and the motor current, the current position of the movable member changes in response to an actuation of the motor; and
  a current positional information correcting portion for determining the current position of the movable member on the basis of the initial positional information in a case where the lock state determining portion determines that the movable member is in the locked state and an electrification of the motor is stopped after the motor has just been started, irrespective of the current positional information calculated by the current positional information calculating portion after the motor is started.

2. The sate memory control device according to claim 1, wherein the motor is continuously driven at least for a minimum actuation amount, which is preliminarily set, even in a case where an operation switch for driving the motor is turned off.

3. The state memorizing device for the movable member according to claim 1, wherein the movable member is a seat cushion.

4. The state memorizing device for the movable member according to claim 1, wherein the movable member is a seatback.

5. A state memorizing device for a movable member, comprising:

a lock state determining portion for determining whether or not the movable member, which is driven by a motor, is in a locked state, on the basis of a motor current supplied to the motor;

an initial positional information memorizing portion for memorizing an initial positional information indicative of a current position of the movable member before the motor is started;

a current positional information calculating portion for calculating a current positional information indicating the current position of the movable member on the basis of the position indicated by the initial positional information and the motor current, the current position of the movable member changes in response to an actuation of the motor;

a lock detection area setting portion for setting a lock detection area so that a predetermined distance is included within a range of movement of the movable member at least at a rear side in a front-rear direction of a vehicle body with reference to a previous lock detection area, at which the locked state of the movable member is detected; and     a current positional information correcting portion for determining the current position of the movable member on the basis of the previous lock detected position in a case where the motor is stopped while the movable member is positioned within the lock detection area, irrespective of the current positional information calculated by the current positional information calculating portion after the motor is started.

6. The state memorizing device for the movable member according to claim 5, wherein the current positional information correcting portion determines the current position of the movable member on the basis of the initial positional information in a case where the movable member is moved into the lock detection area from outside thereof.

7. The state memorizing device for the movable member according to claim 5, wherein the lock detection area is cleared in a case where the motor is driven so as to move the movable member to exceed the lock detection area set at the rear side in the front-rear direction with reference to the lock detected position.

8. The state memorizing device for the movable member according to claim 5, wherein the lock detection area is updated on the basis of the lock detected position in a case where the lock state of the movable member is detected at a position outside of the lock detection area.

9. The state memorizing device for the movable member according to claim 5, wherein the movable member is a seat cushion.

10. The state memorizing device for the movable member according to claim 5, wherein the movable member is a seatback.

* * * * *